Figure 1:
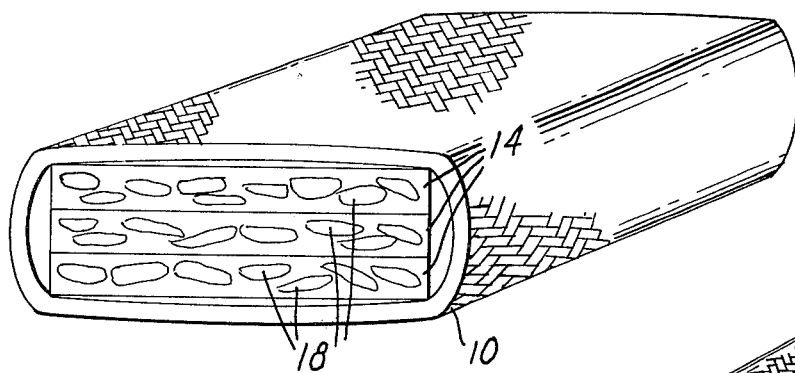

United States Patent [19]

Close et al.

[11] 4,156,533

[45] May 29, 1979

[54] HIGH TEMPERATURE GASKET

[75] Inventors: James R. Close, Roberts, Wis.; Lance W. Pihlstrom, Oakdale, Minn.

[73] Assignee: Minnesota Mining and Manufacturing Company, Saint Paul, Minn.

[21] Appl. No.: 900,852

[22] Filed: Apr. 28, 1978

[51] Int. Cl.² ............................................. F16J 15/10
[52] U.S. Cl. .................................................. 277/229
[58] Field of Search ............... 277/229, 230, 231, 232, 277/DIG. 11, 166

[56] References Cited

U.S. PATENT DOCUMENTS

| | | | |
|---|---|---|---|
| 475,870 | 5/1892 | Jones | 277/230 |
| 2,666,005 | 1/1954 | Norehad | 277/229 |
| 2,895,759 | 7/1959 | Conrad et al. | 277/229 |
| 3,020,185 | 2/1962 | Moffitt et al. | 277/229 |
| 3,031,357 | 4/1962 | Balkin et al. | 277/229 |
| 3,416,981 | 12/1968 | Figaro | 277/230 |
| 3,781,021 | 12/1973 | Thomson | 277/229 |
| 3,797,805 | 3/1974 | Nielsen | 277/DIG. 11 |
| 3,894,742 | 7/1975 | Trelease | 277/229 |
| 3,904,213 | 9/1975 | Swanson | 277/229 |

*Primary Examiner*—Robert I. Smith
*Attorney, Agent, or Firm*—Cruzan Alexander; Donald M. Sell

[57] ABSTRACT

Gasketing material is produced by combining a tubular casing of braided or woven from continuous inorganic filaments, such as alumina-boria-silica fibers, with a core composition comprising a major proportions of intumescent material, suitably unexpanded vermiculite. Heating the gasket in situ results in expansion to give a resilient gasket stable to temperatures of about 1000° to 1200° C.

6 Claims, 8 Drawing Figures

HIGH TEMPERATURE GASKET

This invention relates to gasketing material and gaskets consisting essentially of an outer woven or braided tubular portion and an inner intumescent core material. In particular, this invention relates to gasketing material having an outer braided tubular structure of continuous inorganic fibers and an inner core of intumescent composition.

Numerous types of gasketing material and gaskets are available as described, for example, in Perry, Chemical Engineer's Handbook, 3rd edition, page 342 and Figure 88 thereof. These very commonly employ asbestos fibers combined in many instances with metallic structures.

It is well-known that, although asbestos fibers are resistant to high temperatures, they are affected by high temperatures with loss of flexibility because of loss of water and any volatile materials that may have been employed with them to facilitate fabrication. In general all metallic gaskets, i.e., free from asbestos, are required for temperatures exceeding about 600° C. However metallic gaskets are generally of low resilience and, after formation, are ill-adapted to temperature cycling to elevated temperatures.

The principal aim or object of this invention is to provide resilient gasketing materials and gaskets for use at elevated temperatures, particularly at temperatures in excess of 500° C. Other aims and objects will become evident herein elsewhere.

In accordance with the aims and objects of the invention gasketing materials are provided which after forming in situ at temperatures of about 600° C. have excellent resilience at temperatures up to about 1000° C. or higher. These gasketing materials are combinations of an intumescent core means and an outer sheathing means, suitably woven or braided inorganic ceramic fibrous material in tubular form or as piping. Piping refers to a narrow strip of woven or nonwoven material folded upon itself and secured in position by sewing or adhesion. The piping or woven or braided ceramic fibers in tubular form, generically referred to as a "sheath," serve as a containment means or jacket for the intumescent core means. The sheathing means and core means are of substantially the same length, that is equilong. In this manner, the core is protected both from fracture and abrasion and if broken is retained within the ceramic fiber jacket and thereby retains good functionality. For temperatures as high as 1000° C. and higher, the reinforcing inorganic fibers used must be of some ceramic fiber type such as zirconia-silica, titania, alumina-boria-silica, alumina-chromia-silica, mullite (alumina-silica) and thoria-silica. Although glass fibers are useful at lower temperatures they should not be used for higher temperatures. Reinforcing fibers should normally individually have a length to diameter ratio of at least 20 to 1. Useful noncontinuous or chopped continuous ceramic fibers include not only weavable fibers as described in U.S. Pat. Nos. 3,709,706, 3,795,524, 3,760,049, 3,793,041 and 3,916,057, but also those which cannot be always made into fabrics such as those described in U.S. Pat. Nos. 3,416,953, 3,449,137, 3,865,599, and 3,865,917 and British Pat. Nos. 1,264,973, 1,323,229 and 1,424,239.

Braiding (including plaiting) or weaving of suitable tubular forms may be effected using conventional equipment such as is used for applying braided electrical insulation. Conveniently the braiding may be applied around a preformed self-supporting core.

The core material may be sufficiently soft and plastic so that it can be extruded into a tubular covering or it may be firmer and extruded as a self-supporting rod- or wire-like material around which a covering can be applied. Relatively narrow strips of core material may be cut from suitable sheet material and inserted loosely in a tubular sheath or braided covering.

The core material comprises, in percents by weight of dry materials, 30–80% of an expandable inorganic material, 5 to 60% inorganic fibrous reinforcing agents and 10 to 70% binder wherein the ratio of organic to inorganic in the binder is about 0.5 to 5.0. Fillers can be included in amounts of 0 to 55%.

The expandable inorganic material includes unexpanded beneficiated flakes of vermiculite, hydrobiotite, or water-swelling synthetic tetrasilicic fluorine type mica (described in U.S. Pat. No. 3,001,571) and hydrous silicates. Unexpanded vermiculite is preferably milled to sufficient fineness with other materials so that the core composition as a whole is easily formed, e.g., extrudable. Materials may be added which intercalate between plates of e.g. vermiculite and aid in intumescence. Suitable hydrous silicates include particularly alkali metal silicates, e.g. sodium silicates in which there is a ratio of $SiO_2$ to $Na_2O$ of at least 2:1 and up to about 4:1. Water should be present in amounts of 3 to about 20% by weight but preferably from about 8 to 10 up to about 12 to 15%.

Fibrous materials are incorporated to serve as reinforcing agents in amounts of from 5 to about 60% by weight of dry materials including chrysotile or amphibole asbestos, alumina-silicate and other vitreous fibers (available under such tradenames as Fiberfrax, Kaowool, chopped E-glass), refractory filaments, e.g., chrystalline alumina whiskers and staple ceramic fibers and, in some cases, fine metallic filaments. It is desirable to avoid the use of asbestos because of the possible health hazard of this material. Metallic filaments are less desirable because of their very different coefficients of thermal expansion. Refractory filaments and ceramic fibers such as described above for the woven or braided cover are generally preferable because of their thermal stability.

The binders which are used are of two types. Organic binders are preferably elastomeric materials, usually incorporated as latices and flocculated on the other parts of the core composition. Latices of natural and synthetic rubbers generally are useful. Preferred organic binders include polychloroprene, acrylonitrile rubbers, chlorosulfonated polyethylene, polybutenes, phenol-formaldehyde thermosets, and the like.

Inorganic binders are preferably montmorillonite, e.g., bentonite, hectorite, or saponite and kaolinite (ball clay). Expanded vermiculite and synthetic mica microflakes as described above can also be employed. The most preferred material because of low cost and ready availability is bentonite.

In one embodiment of the invention gasketing material of the invention is shielded from contamination by liquids such as greases, oils and the like by enclosure in a shielding covering of metal such as metal foil either wrapped helically and sealed or wrapped longitudinally with free edges sealed together.

In order to form an injectable mass to fill a ceramic fabric sleeve by injection a small amount of plasticizer may be required such as glycerine, cellulose ethers, corn syrup, or molasses. However, many of the clays, which may be used as binders, also serve as plasticizers. Extensive milling of the composition and adjustment of water content to some particularly flowability may be required. The exact requirements are determined by the type of gasketing material being constructed and the cross-section thereof. In some cases a core material can be made as a sheet material and cut to strips of suitable size for insertion in a preformed braided ceramic fiber tube. In other cases a tube can be braided around a solid core or the core may be injected as a paste into the tube.

Figure 2:
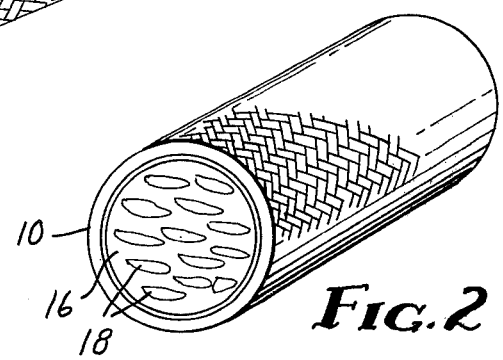
Figure 3:
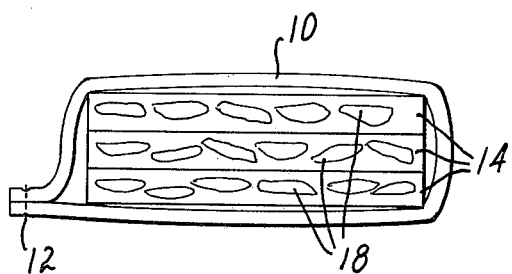

Reference is now made to the drawings herewith for further explanation of the gasketing materials of the invention where FIGS. 1, 2, and 3 show embodiments of gasketing material of the invention.

Figure 5:
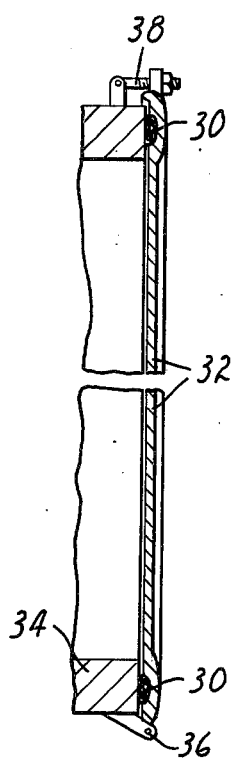
Figure 4:
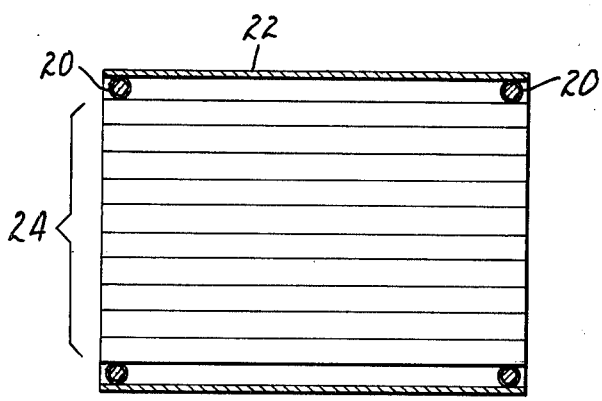

FIGS. 4 and 5 show diagrammatically use of gasketing material of the invention respectively for mounting an automobile exhaust catalyst support and for sealing around an access door.

Figure 6:
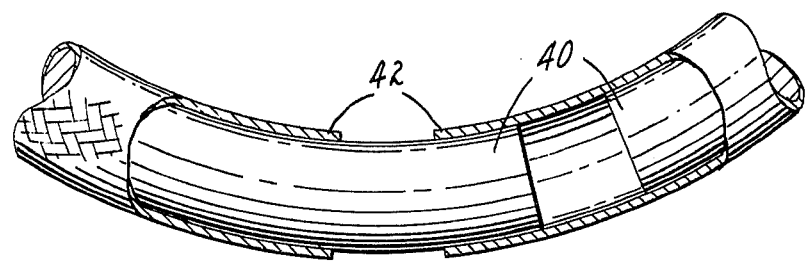
Figure 7:
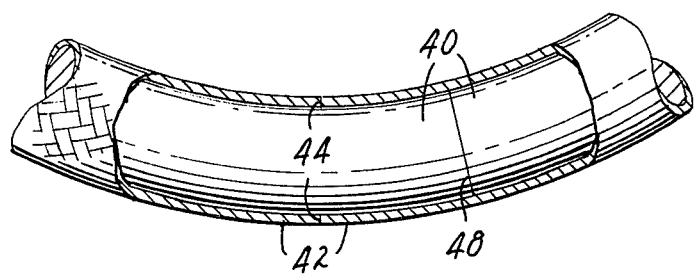
Figure 8:
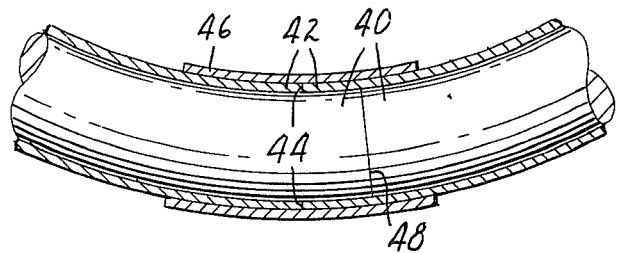

FIGS. 6, 7, and 8 show diagrammatically how annular gaskets can be formed from gasketing material of the invention.

Figure 9:
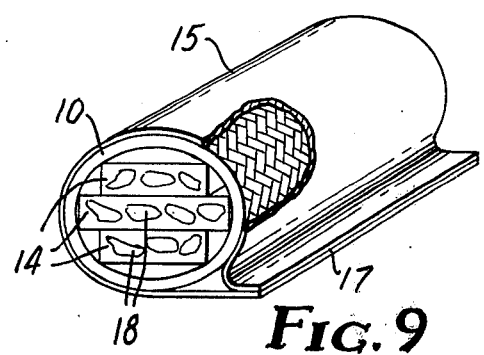

FIG. 9 shows diagrammatically how a shielding covering of metal foil is applied to gasketing material of the invention.

Referring particularly to FIGS. 1, 2, and 3 it will be seen that outer sheathing means (10), which is tubing in FIGS. 1 and 2 and piping sewn together at (12) in FIG. 3, contains a core material composed of sheets (14) in FIGS. 1 and 3 and of a rod (16) in FIG. 2. The core material contains particles (18) of intumescent material shown symbolically. For the sake of making the drawings less complex the yarn of which sheathing means (10) is composed is indicated only partially in FIGS. 1 and 2 and not at all in the ends. It will be understood that the yarn is composed of multiple long continuous inorganic filaments individually too small to illustrate. The filaments may be of any desired composition as noted above, such as alumina-containing, titania-containing, silica-containing, etc. They are generally very fine of the order of a few microns in order to have suitable flexbility. Core materials (14) and (16) may be in greater or lesser proportions with respect to the central openings of the sheathing means as will be evident from the disclosure herein.

FIG. 4 illustrates diagrammatically by a cross-sectional view how gasketing material of the invention (20) is placed between canister (22) and ceramic catalyst support (24) as described herein with respect to Example 3. FIG. 5 illustrates how gasketing material (30) can be placed between a normally closed access door (32) of a stove, oven or furnace, such as for ash removal, and the frame (34). The door is hinged at (36) and bolted shut at (38).

FIGS. 6, 7, and 8 show one convenient manner for making a continuous annular gasket according to the invention. It will be understood that the gasket need not be circular but can be elliptic, square, rectangular or other shape. It will be seen that core material (40) is moved forward from sheathing material (42) so that one end can be inserted into the other end of the sheathing means as shown in FIG. 6. The two ends of the gasketing material are then approximated as in FIG. 7 so that there is a joining (44) of the sheathing means with the ends of the core material (48) substantially offset from the joining. In FIG. 8 it will be seen that an additional piece of sheathing (46) can be included to further strengthen the joining (44). It will be recognized that it will have to be introduced before completing the joining or applied as a wrapping around the joining of the annular gasket.

FIG. 9 shows gasketing material of the invention numbered as for FIGS. 1 and 2 with the addition of shielding covering (15) adhered along edges (17) to provide impermeability to oils, greases, etc.

The invention is now further illustrated by examples.

EXAMPLE 1

Ceramic fibers of composition $3Al_2O_3.B_2O_3.2SiO_2$ as described in U.S. Pat. No. 3,795,524 are converted to yarn and woven into tubes using a conventional tubular braiding machine. Tubes of 6.4 and 19.0 mm diameter are prepared. Cores for the tubes are cut about 10 and about 25 mm wide respectively from intumescent sheet material 1.5 mm thick described in Example 5 of U.S. Pat. No. 3,916,057. As many as possible of these strips are inserted in the respective flaccid tubes to give flexible gasketing strips suitable particularly for use under low pressure differentials such as microwave oven door, furnace access door, etc.

EXAMPLE 2

A 25 cm long×1 cm diameter braided sleeving prepared from ceramic fibers as in Example 1 was filled with 3 mm thick and 5 mm wide 25 cm strips of the intumescent sheet material of the same composition as used in Example 1. The combination was heated to 1000° C. in order to expand the core and to provide an intumescent gasketing material. A 400 gram stainless steel weight was placed on top of an annular gasket formed from a 5 cm length of material and the combination heated to 1000° C. and then cooled. The gasket thickness was measured with imposed weight and after removal of the weight. This cycle was repeated five times. The gasket remained soft and flexible throughout the test. The measurements were:

| Cycle | Weighted Thickness | Unweighted Thickness |
|---|---|---|
| 1 | 6 mm | 8 mm |
| 2 | 6 | 8 |
| 3 | 6 | 8 |
| 4 | 5.5 | 6.2 |
| 5 | 5.5 | 6.2 |

EXAMPLE 3

An extrudable core composition is prepared from 60 g.—expanded vermiculite
2000 ml.—water
5 g.—glass fibers (Fiberglas 106 from Johns-Manville)
15 g.—alumino-silicate fibers (Kaowool from Babcock Wilcox)
180 g.—unexpanded vermiculite ore (Zonolite No. 4 from W. R. Grace)
40 g.—bentonite (Georgia kaolin clay)
20 ml.—1% anionic polyacrylamide flocculant (Separan MP-10).

The first two are combined in a blender and agitated vigorously for 10 minutes to give a smooth dispersion. The other components are then added and agitated thoroughly to give a homogeneous dispersion which is collected on a filter. The filter cake is redispersed with sufficient 2% aqueous solution of methoxycellulose (Methocel from Dow Chemical) on a sigma blade mixer, i.e., pugged, to give a smooth plastic core material containing about 50% water by weight which is readily extruded from a hand caulking gun.

A piece of tubing about 6.4 mm in diameter as used in Example 1 and about 35–40 cm. long is closed at one end by tying with ceramic fiber cord. The above plastic core material (about 30 g.) is then extruded into the tube which is filled. The open end of the tubing is then tied. The section of gasketing material is partially dried while maintaining sufficient flexibility to conform to a seal flange and is employed for mounting a catalyst support in a casing for use as an automotive exhaust gas catalyst unit. Exhaust gases are passed through the catalytic unit in order to raise the temperature to a dull red heat and simultaneously expand the intumescent material of the gasket. The unit is subjected to violent vibration over about one hour with no deterioration of the gasket seal.

EXAMPLE 4

Gasketing material is prepared from ceramic fiber sheath as prepared in Example 1 about 6 mm diam. with a core composed of

|  | Parts |
|---|---|
| Polychloroprene | 25 |
| (Neoprene W from DuPont) |  |
| Hydrous sodium polysilicate | 56 |
| (Britesil H-24 from Philadelphia Quartz Co.; $Na_2O . 2 . 4SiO_2$ with about 8–10% $H_2O$) |  |
| Phenol-formaldehyde thermosetting resin | 11 |
| (Varcum 5485 from Reichhold Chemical Co.; 65–75° F. softening point) |  |
| Silica | 8 |
| (about 1 micron particle size; MIN-U-SIL from Pennsylvania Glass and Sand Co.) |  | which have been compounded in a Banbury mixer and milled together to a flexible rubbery composition and extrudes as a rod 5.5 mm in diam. The gasketing material is made into an annular gasket by drawing the core out for about 1–2 cm and inserting this into the opening at the other end. A small amount of a silicone adhesive (such as Silastic 732 RTV from Dow Corning) may be applied to secure the annular configuration. A thermocouple is applied at the seal, the assembly inserted in a furnace at room temperature and the temperature raised at a rate of about 100° C. per hour while passing nitrogen through the tube and measuring pressure and flow rate. The back pressure, which is a function of the effectiveness of the seal increases from 0.0012 kg/cm$^2$ at 25° C. and 0.36 l/min to 0.035 kg/cm$^2$ at 350° C. and 0.37 l/min an increase of about 30 fold. At higher temperatures up to 500° C. the back pressure decreases presumably because of gradual deterioration of the organic binders (neoprene and phenolic resin) in the composition.

EXAMPLE 5

Gasketing is prepared using ceramic fiber sheath made by folding a 40 mm wide strip of tweed cloth woven from alumina-silica-boria fibers as in Example 1 and sewing using ceramic thread. The tube is thus about 0.076 mm thick and 20 mm wide as shown in FIG. 3. As described in Example 1 above cores of intumescent sheet material about 1.5 mm thick and 12 mm wide are inserted as two or three layers, i.e. cores 3.0 mm and 4.5 mm thick. These gasketing materials are formed into annular gaskets as above and tested as in Example 4 above in the space between a 38 mm outside diameter stainless steel tube and the 48 mm inside diameter of the crucible. The material with 3.0 mm core gives a maximum back pressure at 780° C. of 0.004 kg/cm$^2$ at a flow rate of 0.5 l/min whereas the one with 4.5 mm core gives maximum back pressure of 0.018 kg/cm$^2$ and 800° C. at flow rate of 0.5 l/min.

Temperature cycling between 25° C. and 800° C. for 3 times showed that the sealing properties of the latter were retained over the several cycles. This indicates that the gasketing material should occupy at least 50%, preferably at least 75% and more preferably at least 90%, of the space to be filled.

EXAMPLE 6

An annular gasket is prepared as in Example 4 above except that a short additional length of ceramic fiber sheath is fitted externally over the fitted joint in the initial sheath and extending for about 2–4 cm on either side of the fitted joint. This provides an improved and preferred joint in an annular gasket. Tested in the apparatus of Example 4 a back pressure of 0.0316 kg/cm$^2$ is maintained at 1080° C. and flow rate of 0.50 l/min.

EXAMPLE 7

Gasketing material as prepared in Example 1 are provided with a shielding coating of 0.125 mm aluminum foil applied lengthwise as shown in FIG. 9 with edges sealed using pressure sensitive adhesive. The particular type of adhesive is not critical because organic residues will be largely volatilized at temperatures at which intumescence is effected. It will be evident that shielding coatings of other methods can also be used and that other methods of application such as by helical winding are also possible.

What is claimed is:

1. A composite gasketing material comprising, in combination, outer sheathing means of continuous inorganic filaments and having cross-sectionally a central free space, equilong intumescent core means within said sheathing means at least partially filling said central free space of said sheathing means and expandable to fill said free space of said sheathing means, said intumescent core means being a composition comprising, in percentages by weight of dry material, about 30 to about 80% of an expandable inorganic fibrous material, about 5 to about 60% inorganic reinforcing agents, 0 to about 55% of fillers and about 10 to about 70% of organic and inorganic binders in combination in ratios of 1:2 to 5:1.

2. A composite gasketing material according to claim 1 wherein the expandable inorganic material of the intumescent core means is unexpanded vermiculite, hydrobiotite, water-swelling synthetic tetrasilicic fluorine-type mica or hydrous alkali metal silicate containing about 3 to 20% by weight water.

3. Composite gasketing material according to claim 2 wherein the sheathing means is braided or woven tube or piping of silica-containing filaments.

4. Composite gasketing material according to claim 1 in annular form with ends of outer sheathing means abutting to form a joining and with ends of core means substantially offset from ends of outer sheathing means.

5. Composite gasketing material according to claim 4 comprising additionally sheathing overlapping said joining of the ends of the sheathing means and extending on either side of said joining.

6. Composite gasketing material according to claim 1 additionally comprising external shielding means composed of metallic sheet or foil.

* * * * *